United States Patent Office 3,007,198
Patented Nov. 7, 1961

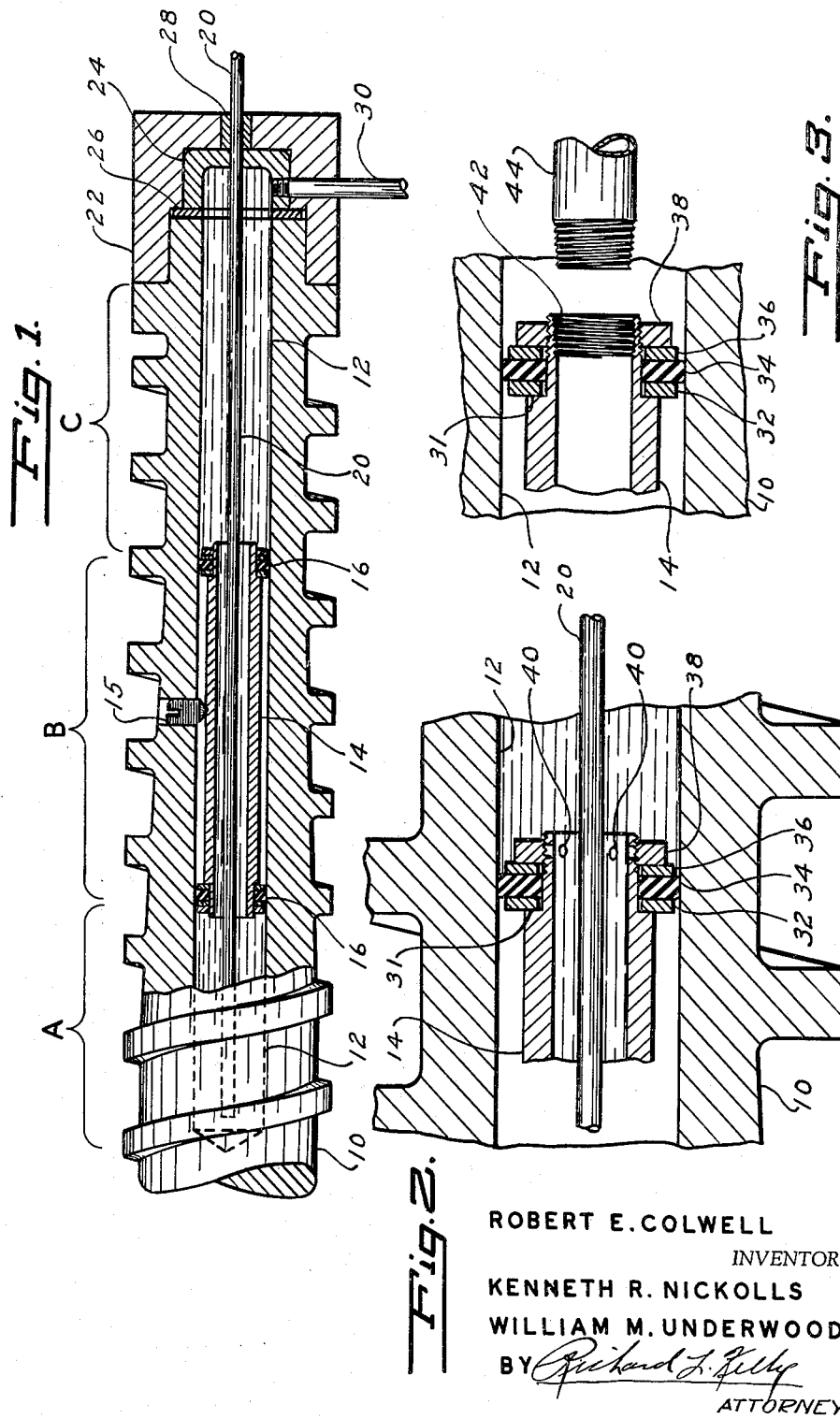

3,007,198
EXTRUDER SCREW
Robert E. Colwell, Springfield, Kenneth R. Nickolls, Wilbraham, and William Murray Underwood, Longmeadow, Mass., assignors to Monsanto Chemical Company, St. Louis, Mo., a corporation of Delaware
Filed Dec. 5, 1958, Ser. No. 778,417
4 Claims. (Cl. 18—12)

This invention relates to a novel screw to be employed in a thermoplastic screw extruder apparatus.

It is an object of this invention to provide a screw for a thermoplastic extrusion apparatus which includes means for heating or cooling two or more sections of the screw and means for maintaining other sections of the screw at equilibrium temperature with the extrudate.

Other objects and advantages of this invention will be apparent from the following detailed description thereof when read in conjunction with the drawings in which FIG. 1 is a side view, partially in section, of one embodiment of the invention, and FIGS. 2 and 3 are enlarged fragmentary sectional views showing details of a sealing portion of the tubular insert provided in the bore of the screw as shown in FIG. 1.

Referring to FIG. 1, 10 designates a rotatable extruder screw having a longitudinal bore 12 which runs throughout a substantial portion of its length. The means employed to rotate screw 10 are conventional, e.g., keying the screw to a rotating collar, and, for the sake of brevity, are not illustrated and described. A tubular insert 14 is positioned substantially centrally within the bore 12 and is held in spaced-apart relationship with the bore walls by resilient sealing means 16—16 which are provided on both terminal ends. The position of tubular insert 14 within the bore 12 is maintained by a set-screw 15. In addition to supporting the tubular insert, sealing means 16—16 divide the bore 12 into 3 fluid tight chambers A, B and C. The detailed structure of the sealing means 16—16 is illustrated in FIG. 2 and will be subsequently described. A fluid delivery tube 20 extends through the bore 12 and the tubular insert 14 and terminates in chamber A.

A rotary joint housing member 22 and a rotary joint liner 24 press rotary joint seal 26 against the end face of extruder screw 10 to establish a fluid tight seal. The fluid delivery tube 20 enters rotary joint housing 22 through a fluid tight seal 28 and rotary joint liner 24 is provided with a threaded opening to receive a fluid outlet tube 30.

In operation, a heat transfer fluid, which may be either heated or cooled, is pumped (by means not shown) through fluid delivery tube 20 into chamber A where the fluid contacts the walls of bore 12. The heat transfer fluid next passes through tubular insert 14 and does not contact the walls of the bore 12 in chamber B. The heat transfer fluid then passes through chamber C and again contacts the walls of bore 12. Finally the heat transfer fluid is discharged from the apparatus through outlet tube 30. From the foregoing, it is apparent that those portions of screw 10 contiguous to chamber B will be maintained at a temperature different from that of those portions of the screw 10 which are contiguous to chambers A and C. If desired, two or more tubular inserts similar to 14 may be provided within the bore of the extruder screw to provide a series of 5 or more zones which are alternately heated (or cooled) or left to attain equilibrium temperature with the extrudate.

As shown in detail in FIG. 2, the ends of tubular insert 14 are provided with recessed shoulders 31 and external threads. The sealing means comprise a threaded adjusting nut 38, a first retaining ring 32, a resilient sealing ring 34 of an elastomer such as polychloroprene and a second retaining ring 36. The external diameter of sealing ring 34 is substantially the same as the internal diameter of bore 12. As the threaded adjusting nut 38 is tightened, the resilient sealing ring 34 is compressed by retaining rings 32 and 36 and distended to provide a fluid tight seal when inserted into the bore 12. Because of the resilient nature of sealing rings 34, the tubular insert can be readily slid along the bore 12 to change the relative lengths and positions of chambers A and C. To facilitate the sliding of tubular insert 14 along the bore, holes 40—40 are provided therein through which a suitable hook affixed to the end of a rod (not shown) may be inserted. In FIG. 3, the terminal end of tubular insert 14 adjacent to the opening of bore 12 is provided with internal threads so that the threaded end of a rod 44 may be inserted therein to move the tubular member within the bore.

In the embodiment of the invention illustrated in the drawings, the outside diameter of the tubular insert is smaller than the internal diameter of the extruder screw and the tubular insert is held in spaced-apart, non-touching relationship with the bore wall by the resilient sealing means. Thus, an insulating air space is provided between the bore wall and the wall of the tubular insert. If desired, however, the tubular insert may have an outside diameter substantially the same size as the internal diameter of the bore, provided that the tubular insert is fabricated from a material having a low heat transfer coefficient, e.g., a phenol-formaldehyde resin, wood, cork or the like.

The above descriptions and particularly the drawings are set forth for purposes of illustration only. Many other variations and modifications thereof will be apparent to those skilled in the art and can be made without departing from the spirit and scope of the invention herein described.

What is claimed is:

1. An improved extruder screw comprising in combination an extruder screw having a longitudinal bore provided in the rearward end of said screw and running through a substantial portion of the length of said screw, a tubular insert positioned within said bore intermediate between the forward and rearward end thereof as to define at least three zones within said bore, said tubular insert having an outer diameter smaller than the diameter of said bore and having resilient sealing means longitudinally spaced thereon to provide fluid-tight sealing between the outer diameter of said tubular insert and said bore, fluid sealing means affixed to the rearward end of said screw through which a fluid delivery tube enters the said bore to extend longitudinally through said tubular insert, the outer diameter of said fluid delivery tube having an effectively smaller diameter than the inner diameter of said tubular insert to provide a passage therebetween and fluid discharge means positioned rearward of the said tubular insert.

2. An apparatus as in claim 1 in which the tubular insert carries means for connecting the same to an external element to permit adjustment in the longitudinal position of the tubular insert within the bore of the extruder screw.

3. An apparatus as in claim 2 in which the tubular insert is provided with a hole as means for connecting, the said hole being positioned to the rear of the rearward resilient sealing means.

4. An apparatus as in claim 2 in which the means for connecting provided on the tubular insert consists of internal threads provided in the rearward end thereof.

References Cited in the file of this patent
UNITED STATES PATENTS

| | | |
|---|---|---|
| 2,449,355 | Wiley et al. | Sept. 14, 1948 |
| 2,748,422 | Brown | June 5, 1956 |
| 2,870,546 | Nelson et al. | Jan. 27, 1959 |
| 2,890,026 | Marganski et al. | June 9, 1959 |